United States Patent [19]

Yakich

[11] Patent Number: 4,658,689
[45] Date of Patent: Apr. 21, 1987

[54] VERTICAL BAND SAW WITH CANTILEVER FRAME

[75] Inventor: John L. Yakich, Broadview, Ill.

[73] Assignee: Armstrong-Blum Manufacturing Co., Chicago, Ill.

[21] Appl. No.: 591,033

[22] Filed: Mar. 19, 1984

[51] Int. Cl.[4] .................. B23D 53/04; B27B 13/04
[52] U.S. Cl. ........................... 83/801; 83/812; 83/486.1
[58] Field of Search ............... 83/801, 795, 794, 811, 83/468.1, 488

[56] References Cited

U.S. PATENT DOCUMENTS

| | | | |
|---|---|---|---|
| 1,084,801 | 1/1914 | Hunter | 83/801 |
| 2,958,347 | 11/1960 | Blum et al. | 83/801 |
| 3,072,004 | 1/1963 | Jenkins | 83/488 |
| 3,450,176 | 6/1969 | Pollak et al. | 83/486.1 |
| 3,474,693 | 10/1969 | Wilkie et al. | 83/801 |

Primary Examiner—Donald R. Schran
Attorney, Agent, or Firm—James G. Staples

[57] ABSTRACT

A vertical band saw is supported forward from a rolling carriage in a cantilever fashion by a pivot which allows inclined as well as vertical cuts to be made in a workpiece. The carriage is supported on V-rollers with vertical axes which travel along rails affixed to a base. The cantilevered saw frame has a drive motor mounted to and solely supported by its lower end, which therefore swings in unison with the saw frame when the cut angle is changed.

1 Claim, 9 Drawing Figures

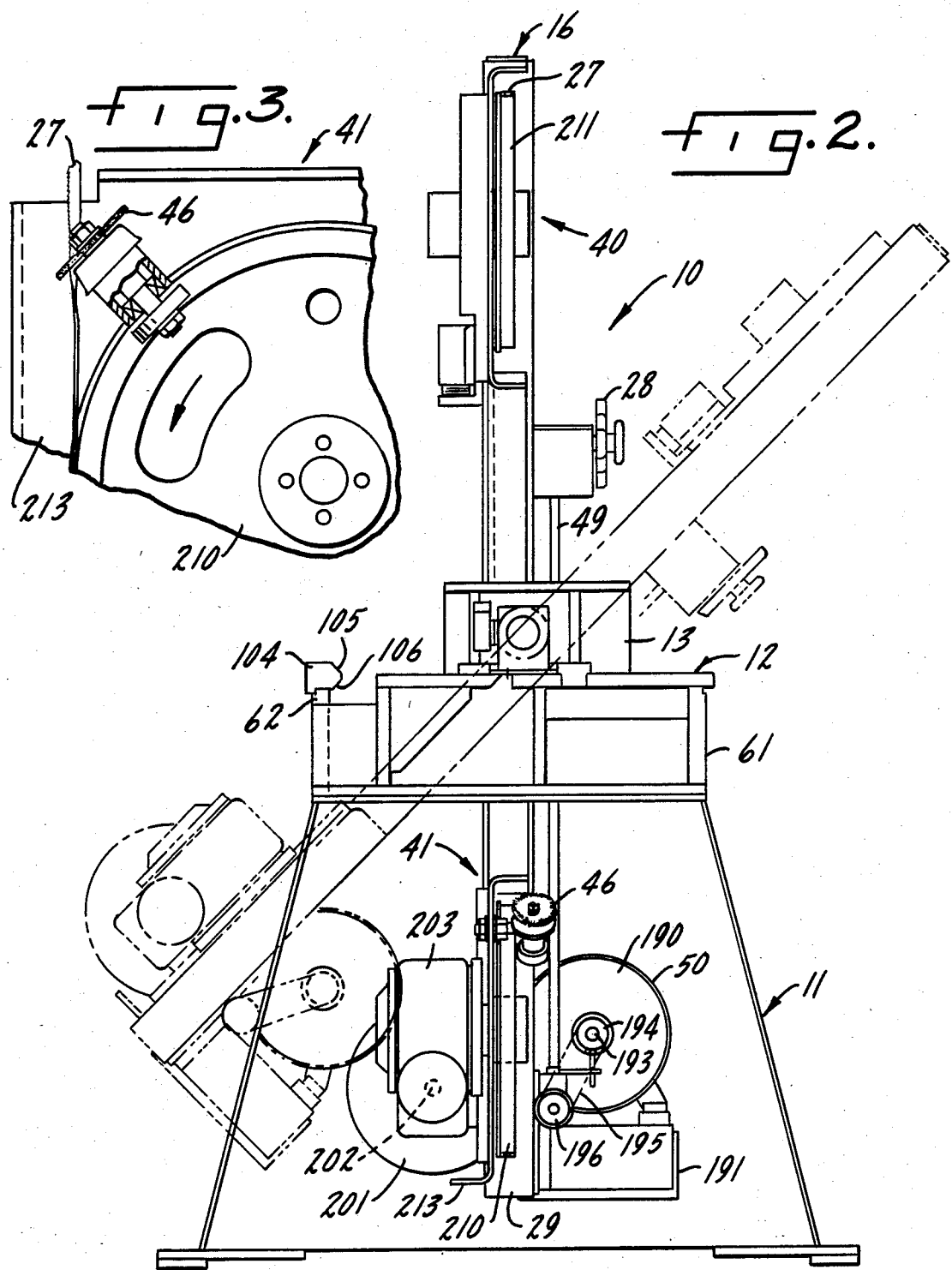

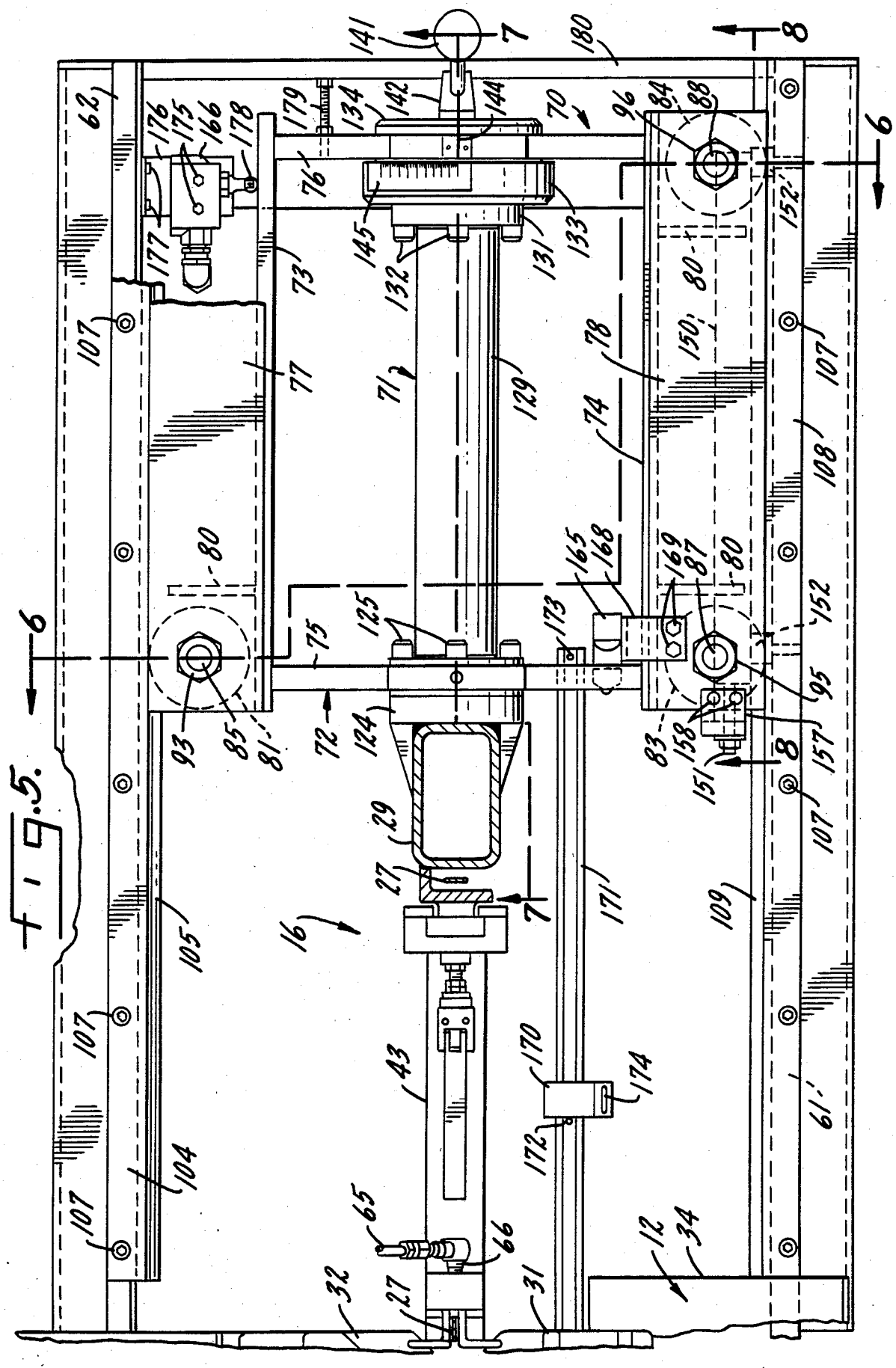

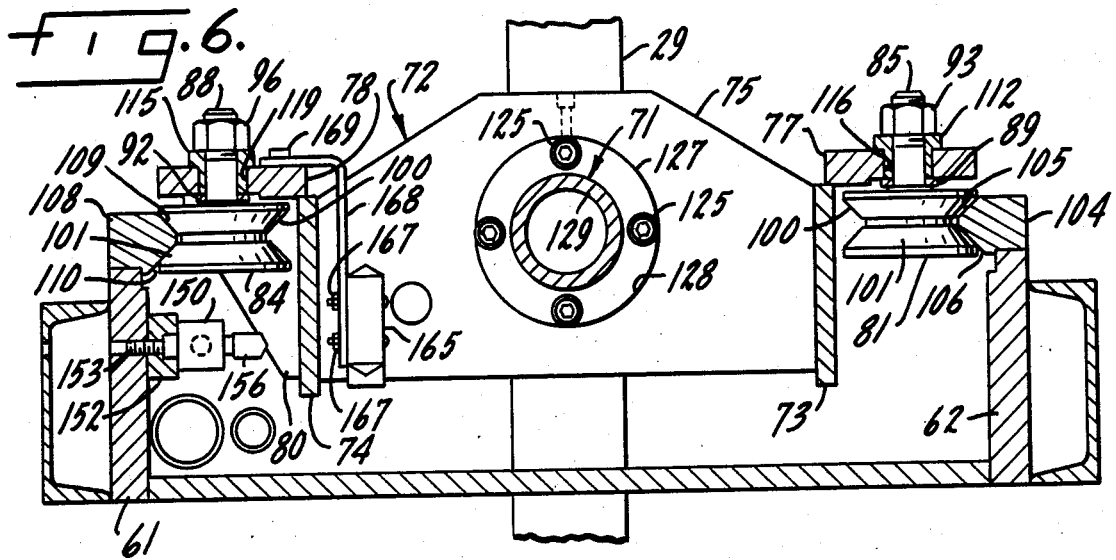
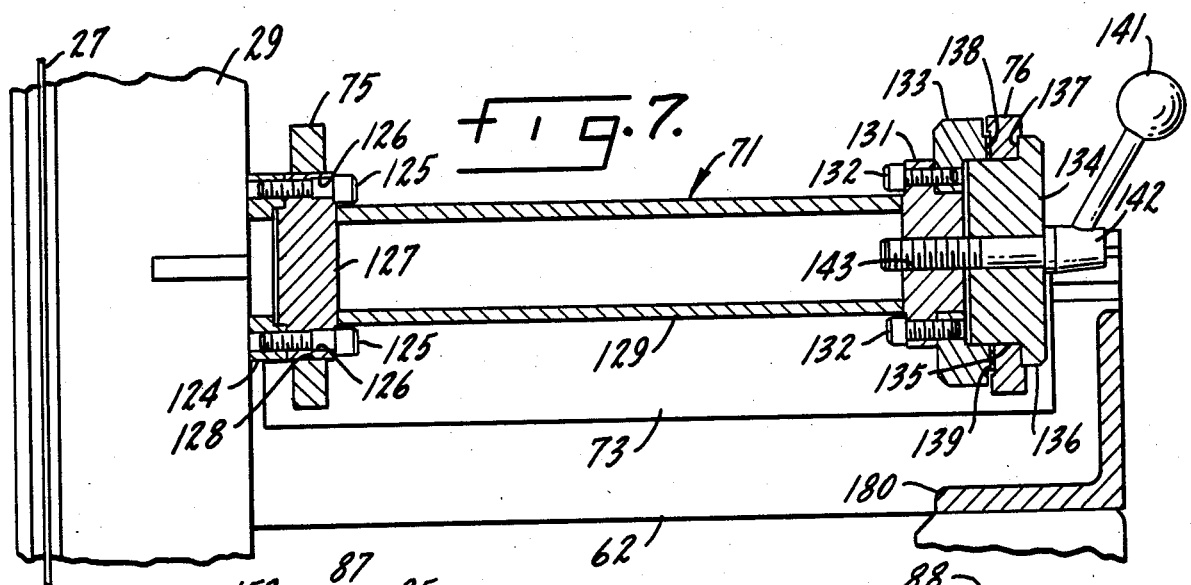
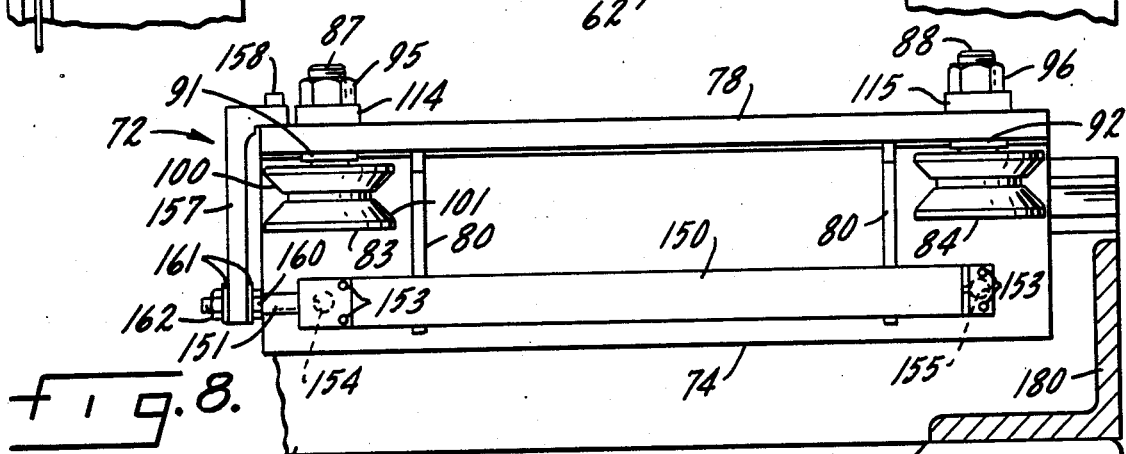
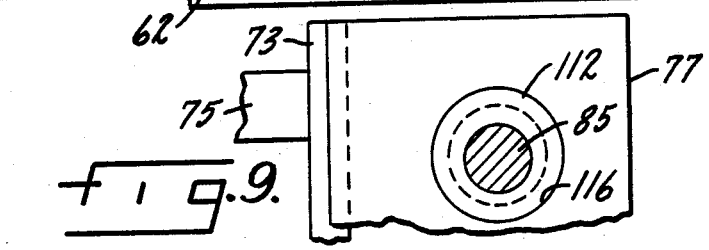

4,658,689

VERTICAL BAND SAW WITH CANTILEVER FRAME

SUMMARY OF THE INVENTION

This invention relates to the field of industrial sawing generally and more particularly to band saws.

One object of the invention is to provide a band saw of economical manufacture and moderate price due to its simpler yet fully versatile design.

Another object of the invention is to provide a vertical band saw whose saw frame is mounted in a cantilever manner entirely forward from its supporting carriage, providing a work area which is closer to the operator, reducing congestion of constituent parts and providing space underneath the carriage for a blade-actuating motor.

A further object of the invention is to provide a band saw mounted on a carriage that is provided with V-rollers which roll on V-shaped ways, reducing the number of rollers needed, number of machined parts and the complexity of adjusting the carriage alignment.

Yet a further object of the invention is to provide a pivoting, vertical, automatic cut-off band saw whose saw blade actuating means comprises a motor mounted directly on the band saw frame, which motor mechanically drives the band saw without the necessity of intervening hydraulic power-transmitting pumps, lines, valves or motors in the band saw drive.

Other objects and advantages will become apparent from the detailed description of the preferred embodiment which will follow.

BRIEF DESCRIPTION OF THE DRAWINGS

FIG. 2 is a front elevation of the band saw, with the saw frame shown in an alternate position by phantom lines and with parts omitted for clarity;

FIG. 3 is a partial side elevation showing a detail of the blade brush;

FIG. 5 is a top plan view showing the carriage and frame assemblies, with parts broken away;

FIG. 6 is a transverse section taken substantially along line 6—6 of FIG. 5;

FIG. 7 is an elevational section taken substantially along line 7—7 of FIG. 5;

FIG. 8 is an elevational section taken substantially along line 8—8 of FIG. 5; and FIG. 9 is a detail in plan view showing an eccentric bushing for a carriage roller.

DETAILED DESCRIPTION OF THE PREFERRED EMBODIMENT

Figure 1:
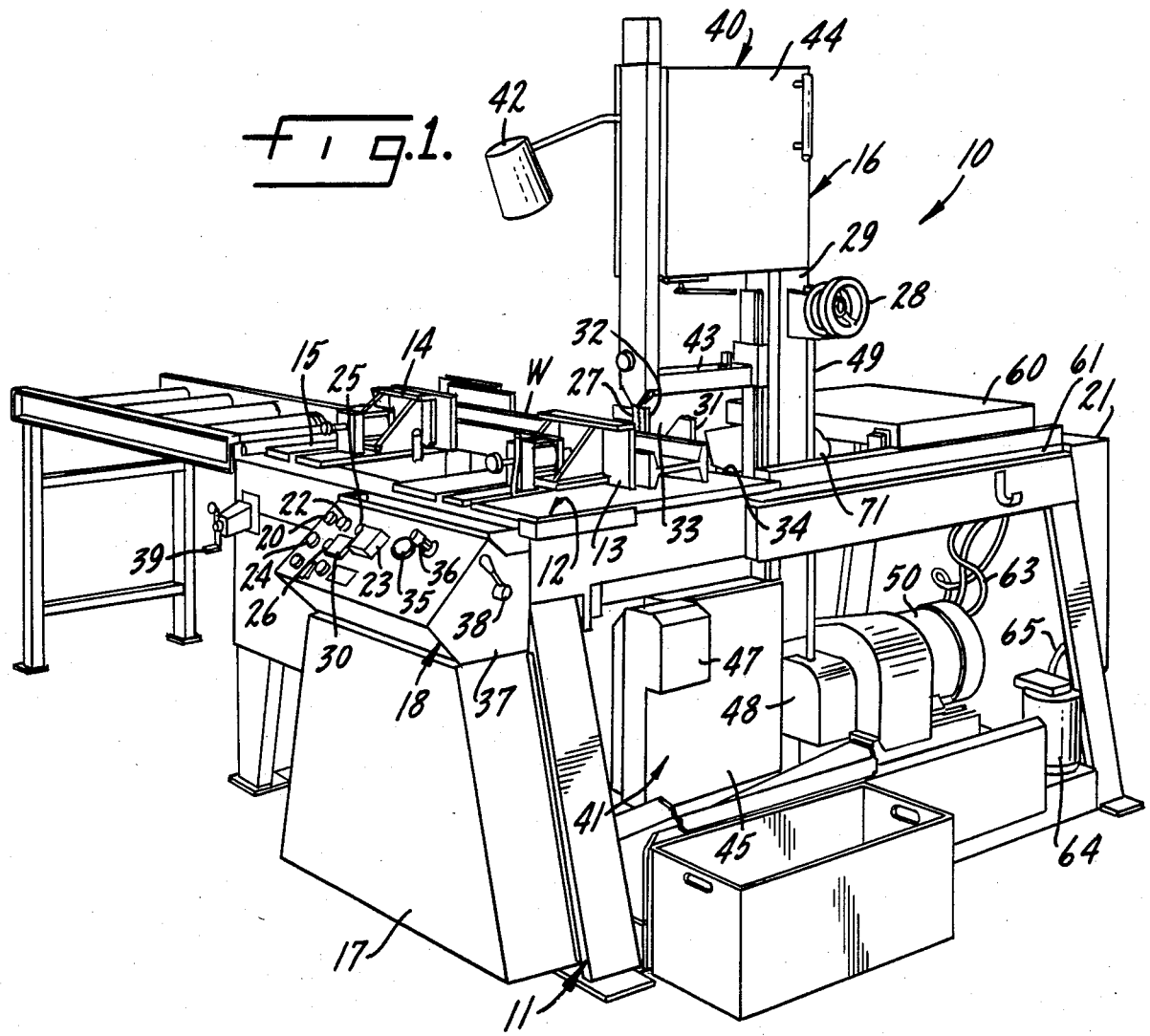
FIG. 1 is a perspective view of a band saw employing the features of the present invention.

Referring to FIG. 1 of the Drawings, there is disclosed a vertical band saw 10 incorporating the invention. Base 11 supports work table 12, on which workpiece W is shown clamped by machine vise 13 and shuttle vise 14. The vises 13 and 14 may be hydraulically operated to clamp and unclamp workpiece W simultaneously, and in concert with hydraulically-powered shuttle bar feed carriage 15 and digital microprocessor circuitry (not shown) allow the band saw to operate as an automatic-feed, automatic cutoff saw.

The hydraulic system which operates the vises 13 and 14, shuttle bar feed carriage 15, and the forward-and-rearward motion of saw frame 16 is situated in hydraulic compartment 17 below operator's control panel 18. Contained within hydraulic compartment 17 are a preferably 1½ HP (1.1 KW) electric motor, a hydraulic pump, a hydraulic fluid reservoir, control valves, filter and associated piping. As the details of the arrangement and workings of the hydraulic system are not important to the present invention, they are not further discussed here. For an example of such details, the reader is referred to U.S. Pat. No. 2,958,347, incorporated by reference.

Operator's control panel 18 preferably has the following controls. A start switch 20 starts the electrical system of the band saw, portions of which are contained within electrical compartment 21, such as an interlocked fused disconnect switch. A master stop switch 22 cuts all power, and a multi-cycle control 23 sets cutoff lengths longer than the maximum shuttle travel length. Two-position cycle selector switch 24 selects between single-cut and automatic cutoff modes of operation for saw frame 16.

Out-of-stock switch 30 stops the saw if there is no stock in the shuttle vise 14 to index. Blade switch 26 stops the downward travel of endless band saw blade 27, or permits band saw blade 27 to run at a speed preset by blade speed control 28, the last of which is located on column 29 of saw frame 16.

Four-position blade frame selector switch 25 controls the direction and speed of movement of frame 16. Its positions are "rapid forward," "rapid return," "neutral" or "feed." When "rapid forward" is selected, frame 16 will carry blade 27 forward rapidly to the position where the cut begins (generally, the plane containing the face of rear vise jaws 31 and 32 of machine vise 13), the blade moving through center slot 33. The selection of "rapid return" will cause the frame 16 to quickly carry blade 27 to or beyond the rear 34 of work table 12, the blade's starting position. "Neutral" is selected when the saw is being loaded or when the setting or checking of the feed force of frame 16 and blade 27 on feed force gauge 35 is desired. When "feed" is selected, the blade 27 will move forward along center slot 33 into workpiece W.

Feed pressure control 36 is used to set the feed force of saw blade 27 on workpiece W, which is displayed on feed force gauge 35. Finally, located on the side 37 of control panel 18 is vise control 38, which, when the band saw is operated in manual mode, will allow the opening and closing of machine vise 13.

To the left of control panel 18 is digital readout 39, mounted on front base member 19, for the setting of shuttle travel.

Saw frame 16 has an upper portion 40 and a lower portion 41, which are connected and supported by frame column 29. Upper portion 40 may be provided with light 42 to illuminate workpiece W, and includes vertically adjustable upper blade guide arm 43 and upper saw blade wheel housing 44.

Lower frame portion 41 includes lower saw blade wheel housing 45, and has fixedly mounted on it chip brush 46 (FIG. 3) inside chip brush housing 47, variable speed transmission housing 48, variable speed control rod 49 (operably connected to blade speed control 28) and blade drive motor 50.

It will be noted that motor 50 derives its sole structural support from frame column 29, extending rearward from column 29 underneath carriage housing 60 and base structural members 61 and 62. Motor 50 and frame 16 suring together as a unit on a pivot 71, in a manner and through the operation of components later described. Electric power is supplied to motor 50 from electrical compartment 21 through flexible power cables 63, which have sufficient slack in them to allow for the complete articulation of frame 16.

Mounted on coolant pan 67 is coolant pump 64, which delivers saw blade coolant through coolant line 65 to a manifold 66 (FIG. 5) on upper blade guide arm 43.

FIGS. 2-9 of the drawings show the novel features of the invention as they affect the saw blade support apparatus. Referring in particular to FIG. 5, there is shown a rolling carriage 70 which supports frame 16 by means of a pivot 71 preferably mounted on carriage frame 72 at the center. Carriage 70 has a left member 73, a right member 74, a front member 75 and a rear member 76, which together form rectilinear carriage frame 72. Weldably mounted to the top of left and right frame members 73 and 74 and to the top of reinforcing members 80 are roller attachment plates 77 and 78. As best shown in FIG. 6, these extend horizontally to either side of carriage frame 72. Referring to FIG. 5, V-rollers 81 and 82 (not shown) are rollably mounted on attachment plate 77. Similarly, V-rollers 83 and 84 are mounted on right roller attachment plate 78. In each case, attachment means such as threaded bolts 85, 87 and 88, spacers 89, 91 and 92 (FIGS. 6 and 8) and nuts 93, 95 and 96 are used. Attachment means for left rear V-roller 82 (not shown) are similar to the attachment means for rollers 81, 83 and 84. V-rollers 81–84 are mounted so that their axes of rotation are vertical and so as to support carriage 70 in a horizontal plane. Each V-roller has an upper inclined rolling surface 100 and a lower inclined rolling surface 101.

As can be best seen in FIG. 6, left front V-roller 81 and left rear V-roller 82 (not shown) are rollably engaged to left guide rail 104. Guide rail 104 has a preferably machined upper bearing surface 105 and a machined lower bearing surface 106 which are angled so as to mate with upper and lower inclined roller surfaces 100 and 101. Guide rail 104 is mounted, as with screws 107, to left base structural member 62 so as to be parallel to the direction of forward-rearward movement of saw blade 27 (FIG. 5). In a similar manner, right V-rollers 83 and 84 are rollably engaged to right guide rail 108 which has inclined, machined surfaces 109, 110. Right guide rail 108 is mounted as by screws 107 to right base structural member 61 in a position parallel to the direction of saw blade movement.

Rollers 81–84 are mounted on roller attachment plates 77, 78 by means of bushings 112–115. During assembly, bushings 112–115 are preferably slipped into bores 116–119 in roller attachment plates 77, 78. Right front bushing 114 and right rear bushing are straight bushings which coaxially receive roller bolts 87, 88. However, referring to FIG. 9, left front bushing 112 is eccentric, such that the axis of its interior bore, and therefore of its received roller bolt 85, is offset from the axis of roller attachment plate bore 116. By turning the eccentric bushing, the lateral position of the left front roller 81 may therefore be adjusted so as to assure optimum rolling support of the front end of carriage 70 on guide rails 104, 108. Left rear V-roller 82 (not shown) has a similar eccentric bushing, which is adjusted in a similar manner to align the rear end of carriage 70 on rails 104, 108.

As previously noted, frame 16 is supported entirely ahead of carriage 70 by means of a pivot 71. Referring to FIG. 2, pivot 71 allows the tilting of frame 16 in a clockwise direction (looking from the front) up to a 45° angle. As best seen in FIG. 5, the axis of pivot 71 is coplanar with saw blade 27 as it cuts the workpiece. Pivot 71 is supported by front carriage frame member 75 and rear member 76.

Referring particularly to FIG. 7, annular boss 124 is preferably welded to frame column 29. Pivot 71 is attached to boss 124 by means such as front pivot attachment screws 125 in order to allow pivot frame alignment during assembly. The screws 125 are received in bores 126 within front pivot bearing 127, which is itself rotatably received in opening 128 in front carriage frame member 75 and is welded to cylindrical pivot sleeve 129.

At its rear end, sleeve 129 is preferably welded to rear pivot member 131, which is itself attached via (for instance) screws 132 to clamp ring 133, the last element also serving as a bearing surface on pivot clamp 134. Cylindrical surface 135 of pivot clamp 134 is rotatably received within rear carriage member 76, and thus serves as the rear pivot bearing. Annular enlargement 136 of pivot clamp 134 provides a rear clamping surface 137, which together with front clamping surface 138 on clamp ring 133 provide a caliper clamping action on rear carriage member 76. Optionally, annular friction disc 139 may be provided between front clamping surface 138 and carriage member 76 to help prevent slippage.

When it is desired to change the attitude of frame 16 with respect to the vertical, handle 141 is grasped and turned in a counterclockwise direction (looking from the rear.) This causes clamp stud 142 to unscrew inside threaded bore 143 of rear pivot member 131, which in turn causes clamp ring 133 and pivot clamp 134 to loosen from the front and rear surfaces of rear carriage member 76. Pivot 71 and saw frame 16 are then free to be attitudinally adjusted to a certain angle from the vertical or back to the vertical, as the case may be. Referring to FIG. 5, the operator may select a predetermined cut angle by aligning pointer 144 on the top of rear carriage member 76 to an appropriate mark on protractor 145 on clamp 133. After the angle of cut has been selected, the operator fixes the attitude of frame 16 by turning clamp handle 141 clockwise (again looking from the rear), thereby clamping pivot 71 and saw frame 16 into place.

The forward and rearward motion of carriage 70 (and therefore frame 16) is actuated by hydraulic cylinder 150 (FIGS. 6 and 8) and associated piston 151. Hydraulic carriage feed cylinder 150 is mounted to right base structural member 61 via any suitable means, in this case via mounting blocks 152 and screws 153 (FIGS. 5, 6 and 8). Hydraulic fluid is supplied to the cylinder via openings 154 and 155.

To cause the carriage and frame to retract to a rearward position, fluid is fed under pressure via a hydraulic line (not shown) to front opening 154, and fluid passes out of rear opening 155 via elbow 156 and another hydraulic line (not shown). The piston 151 is thus displaced in the cylinder rearwardly, and this rearward displacement is mechanically transmitted to carriage 70 through feed cylinder bracket 157, which is affixed to right roller attachment plate 78 by means such as screws 158. Piston 151 is attached to feed cylinder bracket 157 by means such as jam nut 160, washers 161 and locknut 162.

When the feed of the saw blade into the workpiece is desired, hydraulic fluid is fed under pressure through opening 155 and leaves cylinder 150 through opening 154, pushing piston 151 in a forward direction. The flow of the hydraulic fluid is controlled by suitable valving means located in hydraulic compartment 17, the details of which are not important to the invention.

The position of carriage 70 needs to be sensed in order for the length of travel of carriage 70 and therefore frame 16 to be specified. This is done with the aid of limit switches 165 and 166, which can best be seen in FIGS. 5 and 6. Referring particularly to FIG. 6, front limit switch 165 is mounted, as by screws 167, to limit switch mounting bracket 168. Mounting bracket 168 is in turn mounted as by screws 169 to right roller attachment plate 78, so that limit switch 165 moves together with carriage 70.

FIG. 5 shows carriage 70 and limit switch 165 in a fully retracted position. As carriage 70 advances toward the front of the apparatus, limit switch 165 will move forward until it contacts stop 170, and will then signal the hydraulic valving to end the feed pressure and to start the exertion of retraction pressure on carriage 70 through the action of feed cylinder 150.

Stop 170 is set at predetermined point along slide 171 between roll pins 172 and 173. Its position is used to calibrate the limit of the saw feed, and is fixed to slide 171 with the aid of thumb screw 174. With slide 171 attached to the underside of machine vise 13, the stop 170 adjusts automatically with vise movement to limit the saw blade travel for various work sizes.

Rear limit switch 166 is mounted as by screws 175 to mounting bracket 176, which is in turn affixed by screws 177 to left base structural member 62. Limit switch 166 has a rolling wheel 178 which, when carriage 70 is in its retracted position, is kept engaged to left carriage member 73 by spring means (not shown). When carriage 70 rolls forward along rails 104 and 108, wheel 178 springs out; when carriage 70 retracts, member 73 will act to push wheel 178 back in, thereby causing a signal to be generated and the return of carriage 70 to its retracted position to be sensed.

Stop screw 179, attached to rear carriage member 76, provides a mechanical limit to the rearward motion of carriage 70 by abutting rear base structural member 180.

Referring back to FIG. 2, a principal advantage of the present invention is the direct mounting of the band wheel drive means on the lower end of band saw frame 16. Motor 50 (FIG. 4) is mounted behind drive pulley 190 on motor base 191, which is in turn bolted to column 29. Coaxial with motor shaft 192 is speed control shaft 193 (FIG. 4) and sprocket 194. Sprocket 194 is connected by chain 195 to sprocket 196, which receives motion from the rotation of variable speed control shaft 49 as translated in a right-angle direction by variable speed control gearbox 197 (FIG. 4).

Figure 4:
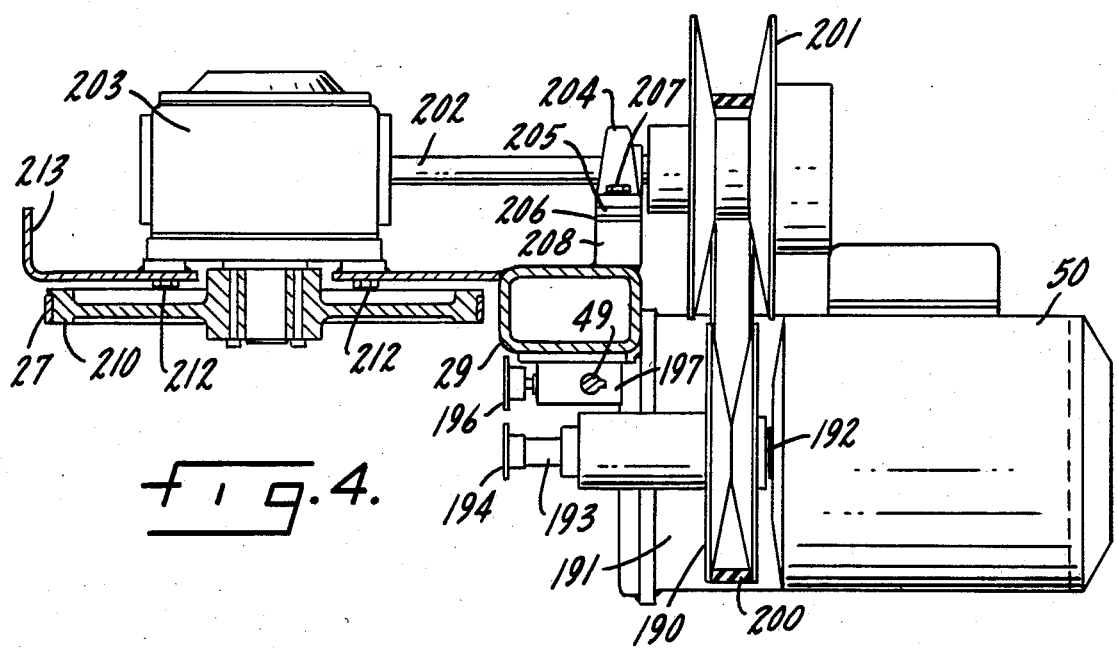
FIG. 4 is a plan view of the band wheel drive assembly.

Turning now to FIG. 4, the layout of the blade drive is shown. Power from motor 50 (a satisfactory motor has been found to be of 3 HP size and 1800 rpm speed) is transmitted by motor shaft 192 to drive pulley 190. Belt 200 connects drive pulley 190 to driven pulley 201, on the left side of column 29. Force transmitted to driven pulley 201 causes drive shaft 202 to turn, which transmits rotational force to right-angle blade wheel transmission 203. Transmission 203 is affixed as by screws 212 to lower frame member 213. The alignment of drive shaft 202 is adjusted by the position of pillow block 204, which through spacer 205, shims 206 and screws 207 (only top screw shown) is adjustably mounted to boss 208. Boss 208 is welded to column 29.

Finally, force from transmission 203 causes lower band wheel 210 to turn, whereby endless saw blade 27 is advanced downward from the upper band wheel 211 to the lower band wheel 210 in front, and from lower band wheel 210 along column 29 to the upper band wheel 211 (FIG. 2). As shown in FIG. 3, lower band wheel 210 also drives rotating chip brush 46, which clears saw blade 27 of sawed particles from the blade gullets.

Although a preferred embodiment of the invention has been disclosed above, it will be understood that modifications may be made within the spirit and scope of the invention. Accordingly it is intended that the invention not be limited by the foregoing description but solely by the scope of the hereinafter appended claims when interpreted in light of the relevant prior art.

Having now described the present invention in detail, I claim:

1. A cantilevered band saw, said cantilevered band saw comprising
 a base,
 a band saw carriage,
 means for supporting the band saw carriage from the base,
 said means comprising firstly, four horizontally disposed V-groove wheels which are rotatable on vertical axis means carried by the band saw carriage, and, secondly, V-rails on the base which co-act with the V-groove wheels to enable the ban saw carriage to move back and forth,
 a band saw frame,
 said band saw frame having means for supporting a band saw thereon,
 a motor for a band saw which is carried on the band saw frame,
 said motor being mounted on the lower end portion of the band saw frame,
 said band saw frame, together with the band saw supporting means and the motor, being pivotally mounted to the band saw carriage at a location ahead of the band saw carriage in the direction of work,
 said band saw frame being thereby pivotable thru a wide range of movement without interference with the band saw carriage.

* * * * *